US012602305B2

(12) United States Patent
Lee et al.

(10) Patent No.: US 12,602,305 B2
(45) Date of Patent: Apr. 14, 2026

(54) CUSTOMER JOURNEY PREDICTION AND RECOMMENDATION SYSTEMS AND METHODS

(71) Applicant: PAYPAL, INC., San Jose, CA (US)

(72) Inventors: Jinwoo Lee, Campbell, CA (US); Vinesh Poruthikottu Chirakkil, San Jose, CA (US); Shalini Rajkumar, Georgetown, TX (US); Pankaj Sarin, Fremont, CA (US); Vibhu Varshney, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 597 days.

(21) Appl. No.: 17/688,661

(22) Filed: Mar. 7, 2022

(65) Prior Publication Data

US 2023/0281102 A1      Sep. 7, 2023

(51) Int. Cl.
G06F 11/34 (2006.01)
G06F 9/451 (2018.01)

(52) U.S. Cl.
CPC .......... G06F 11/3438 (2013.01); G06F 9/453 (2018.02); G06F 11/3452 (2013.01)

(58) Field of Classification Search
None
See application file for complete search history.

(56) References Cited

U.S. PATENT DOCUMENTS

| | | | | |
|---|---|---|---|---|
| 10,599,449 B1 * | 3/2020 | Chatzipanagiotis | ..... | G06N 3/04 |
| 10,990,996 B1 * | 4/2021 | Podgorny | .......... | G06Q 30/0218 |
| 11,502,895 B1 * | 11/2022 | Van Oort | ............ | H04L 12/4633 |
| 11,544,085 B2 * | 1/2023 | Valtchev | ............... | G06F 3/0481 |
| 11,929,963 B1 * | 3/2024 | Zheng | ........................ | G06F 8/77 |
| 2016/0048831 A1 * | 2/2016 | Ongchin | ............ | G06Q 20/3276 705/44 |
| 2016/0239848 A1 * | 8/2016 | Chang | .................. | G06Q 30/016 |
| 2016/0328144 A1 * | 11/2016 | Agrawal | ............... | G06F 3/0488 |
| 2018/0121808 A1 * | 5/2018 | Ramakrishna | .......... | H04L 51/02 |
| 2019/0097909 A1 * | 3/2019 | Puri | .................... | H04L 41/0604 |

(Continued)

OTHER PUBLICATIONS

Ma, Liye, and Baohong Sun. "Machine learning and AI in marketing-Connecting computing power to human insights." International Journal of Research in Marketing 37.3 (2020): 481-504 (Year: 2020).*

(Continued)

*Primary Examiner* — Darlene Garcia-Guerra
(74) *Attorney, Agent, or Firm* — HAYNES AND BOONE, LLP

(57)      ABSTRACT

Systems and methods for customer journey prediction and recommendation are disclosed. In an embodiment, a computer system determines that a user activity for a customer journey has been performed by a user interacting with a platform. The computer system predicts a next user activity that will be performed by the user. The computer system determines a first probability that the predicted next user activity will lead to a positive outcome for the customer journey and a second probability that an alternative user activity will lead to the positive outcome. Based on the second probability being a threshold amount greater than the first probability, the computer system intervenes on the platform to direct the user to the alternative user activity. Related systems and methods are also disclosed.

20 Claims, 8 Drawing Sheets

(56) References Cited

U.S. PATENT DOCUMENTS

| | | | |
|---|---|---|---|
| 2019/0260818 A1* | 8/2019 | Ciabarra, Jr. | G06F 11/3698 |
| 2019/0294718 A1* | 9/2019 | Beringer | G06F 16/2477 |
| 2020/0349581 A1* | 11/2020 | Petluru | G06Q 30/016 |
| 2021/0012547 A1* | 1/2021 | Kumawat | G06F 40/109 |
| 2021/0255914 A1* | 8/2021 | Ciabarra, Jr. | G06F 11/079 |
| 2022/0131769 A1* | 4/2022 | Dille | H04L 43/04 |
| 2022/0148013 A1* | 5/2022 | Sinha | G06F 16/904 |
| 2022/0245013 A1* | 8/2022 | Ciabarra, Jr. | G06F 11/3438 |
| 2022/0245047 A1* | 8/2022 | You | H04L 67/535 |
| 2022/0277360 A1* | 9/2022 | Gerber | G06Q 10/0633 |
| 2023/0013842 A1* | 1/2023 | Sait M A | H04L 51/02 |
| 2023/0015978 A1* | 1/2023 | Maheshwari | G06F 18/295 |
| 2023/0018601 A1* | 1/2023 | Mohan | G10L 15/22 |
| 2023/0021858 A1* | 1/2023 | McReynolds | G06F 16/2379 |
| 2023/0141419 A1* | 5/2023 | Thompson | G16H 20/60 |
| | | | 705/2 |
| 2023/0196210 A1* | 6/2023 | Bustelo-Killam | G06N 3/08 |
| | | | 706/12 |

OTHER PUBLICATIONS

Wolfinbarger, Mary, and Mary C. Gilly. "eTailQ: dimensionalizing, measuring and predicting etail quality." Journal of retailing 79.3 (2003): 183-198 (Year: 2003).*

Mollen, Anne, and Hugh Wilson. "Engagement, telepresence and interactivity in online consumer experience: Reconciling scholastic and managerial perspectives." Journal of business research 63.9-10 (2010): 919-925 (Year: 2010).*

Wang, Yang, Yuran Wang, and Xueming Luo. "Nowcasting in chatbot design: Leveraging service journey patterns to improve user satisfaction." (2020) (Year: 2020).*

* cited by examiner

200

| Short ID | Event | Journey tracking | Remarks |
|---|---|---|---|
| o | Do Nothing | END | All Journey Ends |
| i | Add Card Failure | Journey 1 Start | Tracking Journey 1 Start |
| 9 | Profile Change (Phone) | | |
| e | Payment Success | Journey 2 End | Tracking Journey 2 End |
| h | Add Card Success | Journey 1 End | Tracking Journey 1 End |
| k | Payment Failure | Journey 2 Start | Tracking Journey 2 Start |

| 1 | 2 | 3 | 4 | 5 | 6 |
| --- | --- | --- | --- | --- | --- |
| ID | Next User Activity | Probability of Next User Activity | Next User Activity Precision | Probability of Positive Outcome | Positive Outcome Precision |
| i7i1i | Add Card Failure | 39.97% | 38.11% ~ 41.84% | 10.75% | 8.51% ~ 12.99% |
| i7i10 | Do Nothing | 28.96% | 26.86% ~ 31.05% | 0.00% | 0.00% ~ 0.00% |
| i7i13 | Chat Bot | 12.41% | 10.74% ~ 14.08% | 17.66% | 12.54% ~ 22.77% |
| i7i19 | Phone Change | 5.89% | 4.80% ~ 6.98% | 3.58% | 0.79% ~ 6.37% |
| i7i14 | KANA | 2.20% | 1.62% ~ 2.79% | 8.93% | 0.43% ~ 17.43% |

500

| Monitor user activity | 502 |

↓

| Determine that a user activity corresponds to a customer journey | 504 |

↓

| Predict a next user activity that the user will perform in the customer journey | 506 |

↓

| Determine a first probability that the predicted next user activity will lead to a positive outcome for the customer journey | 508 |

↓

| Determine a second probability that an alternative user activity will lead to a positive outcome for the customer journey | 510 |

↓

| Determine that the second probability is greater than the first probability | 512 |

↓

| Direct the user to the alternative user activity | 514 |

Fig. 5

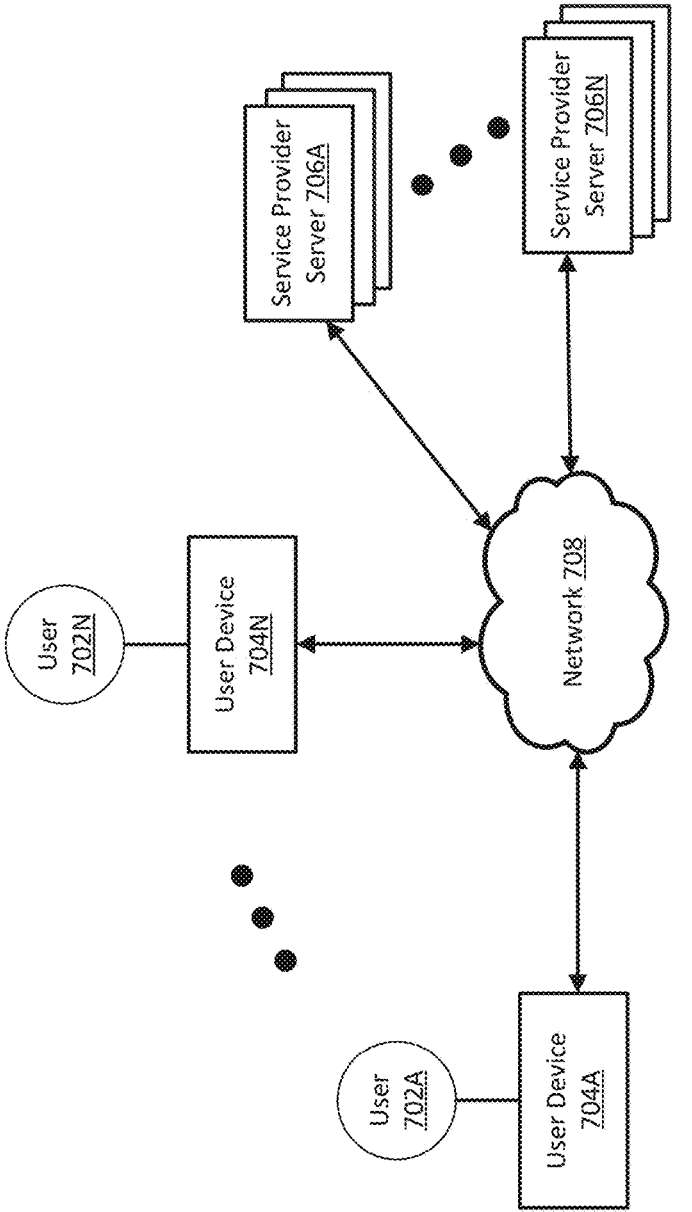
700
Fig. 7

CUSTOMER JOURNEY PREDICTION AND RECOMMENDATION SYSTEMS AND METHODS

TECHNICAL FIELD

The present disclosure generally relates to electronic device user interfaces, and more particularly to predicting digital user interactions and dynamically adjusting a user interface using the predictions according to various embodiments.

BACKGROUND

A series of digital interactions between a customer (e.g., a user) and an electronic service provider's platform is oftentimes referred to as a "customer journey." Sometimes the platform may not be as intuitive in practice as its design intended or may have technical issues that preclude customers from using all of the functionalities of the platform. As a result, customers will often navigate the platform in an inefficient manner or attempt to troubleshoot malfunctions by themselves. Although conventional techniques allow for tracking customer journeys on a platform so that the customer journeys can be studied to improve the platform, such techniques may be too slow to adapt to the behaviors of customers which continue to change quickly and frequently. Thus, there exists a need in the art for systems and methods that allow for dynamically adjusting a platform in near real-time/real-time using behavior pattern recognition in customer journeys.

BRIEF DESCRIPTION OF THE FIGS.

FIG. 2 illustrates an example table of a life cycle configuration for tracking customer journeys in accordance with one or more embodiments of the present disclosure.

FIG. 4 illustrates an example table of a user behavior pattern for a customer journey in accordance with one or more embodiments of the present disclosure.

FIG. 5 illustrates a flow diagram for a process for predicting next user activities in customer journeys and providing recommendations to users in customer journeys as needed to direct the users to positive outcomes for the customer journeys in accordance with one or more embodiments of the present disclosure.

FIG. 7 illustrates a block diagram of a networked system in accordance with one or more embodiments of the present disclosure.

Figure 1:
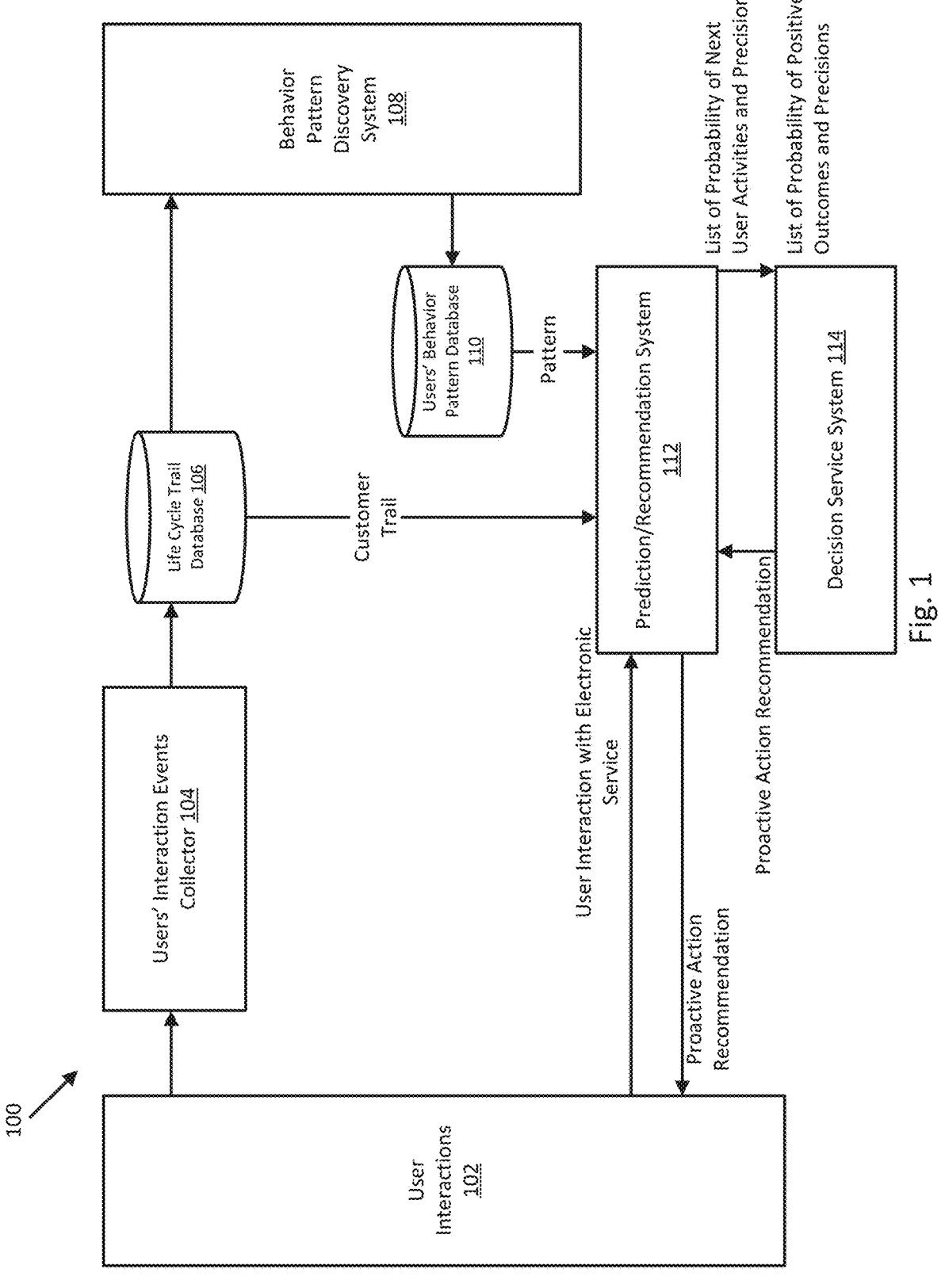
FIG. 1 illustrates a block diagram of a computer system suitable for implementing one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

The present disclosure provides systems and methods for dynamically adjusting electronic service platforms using near real-time user pattern recognition in customer journeys. For example, in an embodiment of the present disclosure, a computer system may monitor user activity of a user digitally interacting with a platform. As the user interacts with the platform, a user activity may trigger an event(s) that is logged (e.g., recorded, tracked) for the platform. The computer system may detect when an event has occurred, where the event indicates that the user has performed the user activity that triggered the event. Certain events may be part of a customer journey that the computer system tracks. For example, the user may have attempted to add payment card information to their user account but failed, which triggered an "Add Card Failure" event that the computer system recognizes. The event and the user activity that triggered the event may be determined to belong to a customer journey that the computer system tracks to understand the behavior of users after they fail to add payment card information. For example, it may be desirable to track customer journeys for when a user fails to add payment card information to learn what users try to do to troubleshoot the issue and how the platform can be dynamically adjusted, as necessary, to efficiently direct the user to a solution for the issue.

Based on a statistical analysis of aggregated data corresponding to user activities for a plurality of users of the platform, the computer system may predict the next user activity that the user will perform in the customer journey. The predicted next user activity may be one of a plurality of potential next user activities for the customer journey, where the potential next user activities are learned based on the aggregated data. The statistical analysis of the aggregated data may be updated in real-time as the user activity data for the platform is aggregated on a rolling basis (e.g., a 24-hour look-back period). Thus, the predicted next user activity should reflect the most recent trend or pattern in user behavior on the platform for the customer journey.

The computer system may determine a first probability that the predicted next user activity will lead to a positive outcome for the customer journey, which can be an outcome defined by the entity associated with the computer system or the computer system. For example, a positive outcome to the customer journey for when the user fails to add the payment card information may be an end event in which the user successfully adds the payment card information. The computer system may determine a second probability that an alternative user activity from the plurality of potential next user activities for the customer journey will lead to the positive outcome. The computer system may compare the first probability to the second probability. If the second probability is a threshold amount greater than the first probability, the computer system may direct the user, via a user interface for the platform, to the alternative user activity. For example, the computer system may direct the user by adjusting the platform to guide the user's attention to performing the alternative user activity.

In some cases, the computer system may analyze the precision associated with the probabilities of the predicted next user activities and potential next user activities when determining whether to intervene in a customer journey. For example, the computer system may determine that a third probability that a third user activity (e.g., a user activity other than the aforementioned predicted next user activity and alternative user activity) from the plurality of potential next user activities for the customer journey will lead to the positive outcome. The third probability may be greater than the second probability, however, when the computer system determines a precision for the third probability, the computer system may find that the precision for the third probability fails to meet a threshold precision. Thus, the computer system may proceed with directing the user to the alternative user activity as described above.

Further details and embodiments are described below in reference to the accompanying figures.

FIG. 1 illustrates a block diagram of a computer system 100 suitable for implementing one or more embodiments of the present disclosure. The computer system 100 includes a users' interaction events collector 104, a life cycle trail database 106, a behavior pattern discovery system 108, a users' behavior pattern database 110, a prediction/recommendation system 112, and a decision service system 114.

The users' interaction events collector 104 may retrieve raw event data logged in association with user interactions 102 with the electronic service platform (e.g., application, website, etc.) provided by an electronic service provider. In the context of online electronic services, the electronic service provider may provide services to a plurality of user accounts (e.g., registered and non-registered accounts). The user accounts may make various electronic service requests to the electronic service provider, to which the electronic service provider may respond by providing the requested electronic service (e.g., an electronic resource and/or function). Generally, a service request to perform an action using the electronic service provider's platform may be considered a user activity for a user account. User account activities may be tracked/logged by the electronic service provider in a user account history for the user account. In some embodiments, the data corresponding to such user account activities may be written to a cache or database and linked to a key or other identifier that represents the user account so that lookup, polling, querying, and other such operations can be performed on the data using the key/identifier. The computer system may store such user activities associated with the user account during a life cycle for the user account. The life cycle may be a predefined period of time for the user account, such as a past day, a past week, a past month, or any other defined period of time. The user account activities may trigger defined events, which are how the computer system 100 recognizes the user activities.

The users' interaction events collector 104 may filter the raw event data to remove event data that is not relevant to determining behavior patterns of user interactions with an application or website for the electronic service provider. The users' interaction events collector 104 may standardize the filtered raw data to provide unified event data that can be easily converted into a life cycle trail using a schema.

For example, in reference to table 200 shown in FIG. 2, the events in the event data may be translated into short identifiers (IDs). Thus, a series of events corresponding to user activities may be expressed as a series of short IDs. For example, if a user has performed user activities corresponding to the events "Add Card Failure", "Add Card Success", and "Payment Success", the user's life cycle trail may be expressed as "ihe" according to the example schema shown in table 200 of FIG. 2. The user activity for each user (or certain subsets of users) for an electronic service provider may be monitored and a corresponding life cycle trail for the user, expressed as a series of short IDs, may be stored in life cycle trail database 106 of FIG. 1.

As shown in FIG. 1, the behavior pattern discovery system 108 may retrieve the life cycle trails for users from the life cycle trail database 106. The behavior pattern discovery system 108 may be configured to aggregate the life cycle trails of the users to discover (e.g., detect) behavior patterns of users in customer journeys on the electronic service provider's platform.

Figure 3:
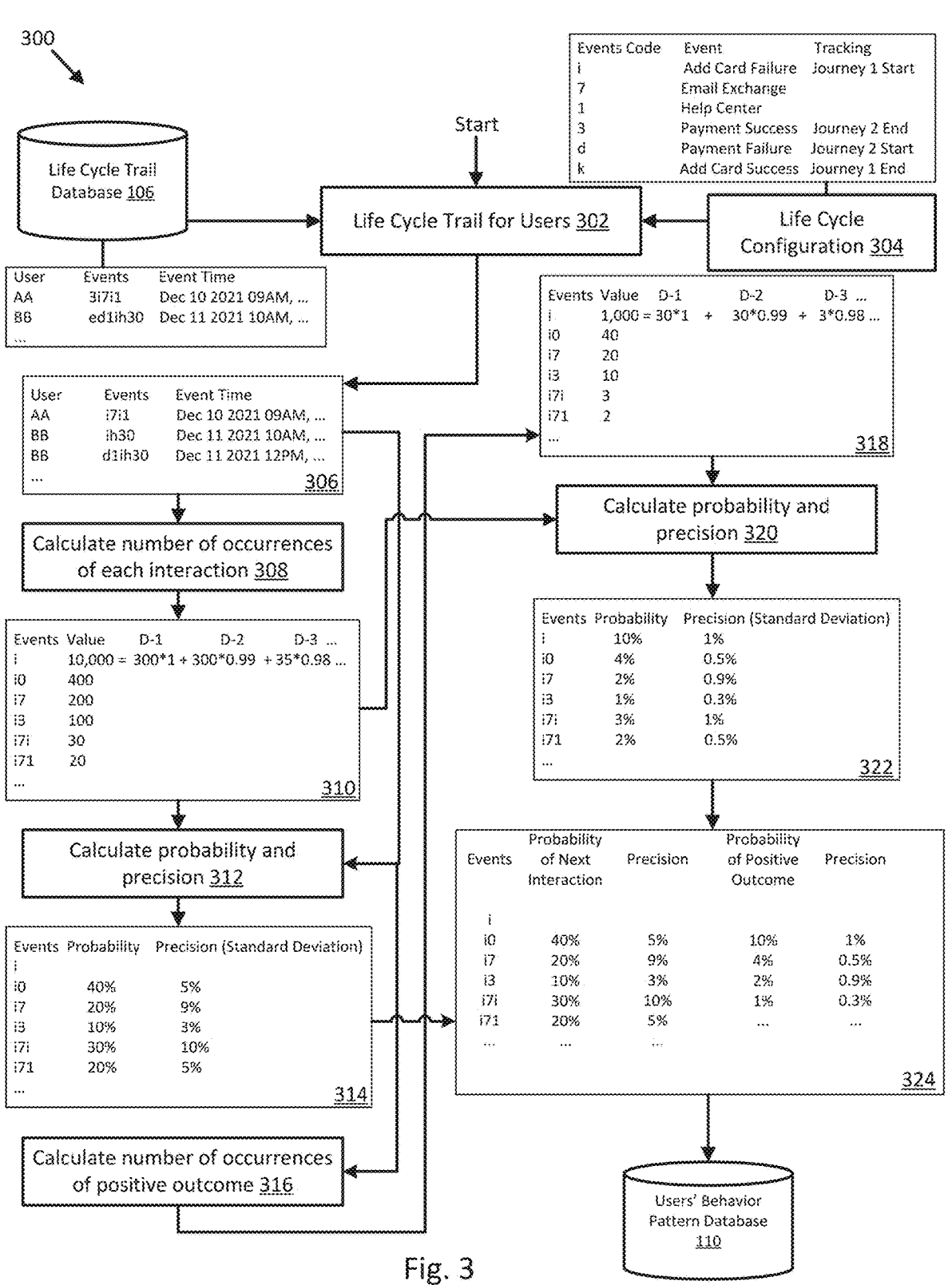
FIG. 3 illustrates a flow diagram for a process for detecting user behavior patterns in customer journeys in accordance with one or more embodiments of the present disclosure.

In some embodiments, the behavior pattern discovery system 108 may detect behavior patterns as shown in flow diagram 300 of FIG. 3. At block 302 in flow diagram 300, the discovery system 108 may retrieve the life cycles trails for users from the life cycle trail database 106. In some cases, the discovery system 108 may limit the life cycle trails it retrieves to life cycle trails that have been recorded during a certain period. For example, the life cycle trails may be retrieved according to a rolling basis such as life cycle trails for the past 24 or 48 hours, the past week, etc. When the discovery system 108 aggregates the life cycles trails over a past period on a rolling basis, a statistical analysis of the aggregated data, from which user patterns in customer journeys are detected, can be updated in real-time or near real-time.

The discovery system 108 may refer to a life cycle configuration 304 when analyzing life cycle trails to determine when certain events of interest for a customer journey has occurred in a life cycle trail. For example, the life cycle configuration 304 may define events that are the start of customer journeys and events that are the end of customer journeys, as well as any intermediate events that can be part of a customer journey.

For example, as shown at block 306, for user AA, whose recent life cycle trail obtained from the life cycle trail database 106 is "3i7i1," the discovery system 108 may ignore the events that occur in the life cycle trail until the event code "i" is observed per the life cycle configuration 304, which indicates the start of a customer journey that is tracked, as denoted as "Journey 1" in the life cycle configuration 304. The discovery system 108 may track which user activities, based on corresponding events, take place after the start of the customer journey to detect user behavior patterns.

As shown in the example for the life cycle configuration 304, the event code "i" corresponds to an "Add Card Failure" event, which is triggered when a user fails to add payment card information to their user account or fails to add payment card information for a transaction checkout. Since failing to add a payment card information is a poor user experience, it is valuable to track customer journeys that start with such a user activity as it may provide further insight as to what users try to do to remedy the situation and how the electronic service provider can guide the user to a positive outcome for the customer journey (e.g., successfully adding the payment card information).

Another example in block 306 is shown for user BB, whose recent life cycle trail obtained from the life cycle trail database 106 is "ed1ih30." The discovery system 108 may ignore the events that occur in the life cycle trail until the event code "i" is observed per the life cycle configuration 304, which indicates the start of a customer journey of interest.

At block 308, the discovery system 108 may calculate the number of occurrences of each interaction for users that are being monitored in their customer journeys. An interaction may be the user activities that a user performs on the platform, which leads to a series of one or more recorded events.

For example, as shown in block 310, the interaction corresponding to "i" occurs 1000 times. The interaction corresponding to "i0", which is the event "i" followed by an event "0", occurs 400 times. The interaction corresponding to "i7", which is the event "i" followed by an event "7", occurs 200 times. The interaction corresponding to "i3", which is the event "i" followed by an event "3", occurs 100 times. The interaction corresponding to "i7i", which is the event "i" followed by the event "7" followed by the event "i" again, occurs 30 times. The interaction corresponding to "i71", which is the event "i" followed by the event "7" followed by the event "1", occurs 20 times, and so forth.

In some embodiments, as denoted by "D-1", "D-2", and "D-3" in block 310, instances of interactions can be weighted. For example, D-1 may correspond to instances of an interaction that occurred in the past hour, which may be weighted more than instances of interactions corresponding to D-2, which may have occurred between one to two hours ago. Similarly, instances of interactions corresponding to D-2 may be weighted more than instances of interactions corresponding to D-3, which may have occurred between two to three hours ago, and so forth.

As another example, D-1 may correspond to instances of interactions performed by valuable users, such as users that meet criteria (e.g., users that conduct a large volume of electronic transactions using the electronic service provider's platform). In this regard, D-2 and D-3 may correspond to instances of an interactions by less valuable users per the criteria in a tiered fashion (e.g., users who conduct a smaller volume of electronic transactions using the electronic service provider's platform are given less weight). Thus, the electronic service provider can focus on improving its platform for its more valuable users.

At block 312, the discovery system 108 may calculate a probability and precision for the interactions. For example, as shown at block 314, the probability of the interaction "i0" may be computed as the number of occurrences of "i0" divided by the previous interaction "i," which is the start of customer Journey 1 per the life cycle configuration 304. Thus, the probability of the interaction "i0" may be computed as 400/1000 from the example shown in block 310. In other words, a user who has performed the interaction "i0" must have performed the previous interaction "i" before proceeding to "i0," thus the probability of "i0" is based on the total occurrences of "i0" divided by the total occurrences of "i."

Therefore, the probability of an interaction calculated at block 312 may be considered the probability that the user will perform the next user activity in the interaction subsequent to a previous user activity for a previous interaction. For example, the probability of 40% for the interaction "i0"

indicates that the next user activity corresponding to event "0" is 40% likely to occur after the user has performed the user activity corresponding to event "i." As another example, the probability of interaction "i7i" indicates that the next user activity corresponding to event "i" is 30% likely to occur after the user has performed the user activities corresponding to the events "i" and "7."

Further at block 312, the discovery system 108 may calculate the precision of the interactions using a standard deviation formula as would be understood by one of skill in the art. For example, as shown in block 314, the precision for the probability of 20% of the interaction "i7" occurring after the interaction "i" has occurred is calculated to be 9%. In other words, the probability that a next user activity corresponding to the event code "7"is performed by the user, after previously performing the user activity of the previous interaction "i," is 20% and the precision for said probability is 9%.

At block 316, the discovery system 108 may calculate the number of occurrences of a positive outcome for each interaction of the tracked customer journeys. A positive outcome may be a type of event defined in the life cycle configuration 304 for a tracked customer journey. For example, the start of tracked customer Journey 1 in the life cycle configuration 304 is an "Add Card Failure" event (event code "i"), and the positive outcome is the "Add Card Success" event (event code "k"). Thus, the discovery system 108 may calculate the number of occurrences of the "Add Card Success" event following each interaction for customer Journey 1.

To avoid having to track customer journeys indefinitely, the discovery system 108 may limit its monitoring of ongoing customer journeys for users to a certain time period. For example, for customer Journey 1, the discovery system 108 may only monitor ongoing occurrences of customer Journey 1 for a 24-hour period following the detection of a start of the customer Journey 1 (event code "i") to see whether the customer Journey 1 has ended in a positive outcome (event code "k"). Each tracked customer journey may have its own time period for which the discovery system 108 continues to monitor to see whether it ends in a positive outcome for a user in the customer journey. If the time period expires, the occurrence of the customer journey will be used in statistical analysis as discussed below, however, there will be no recorded positive outcome to the customer journey.

Example results for the number of occurrences of a positive outcome for each tracked interaction is shown in block 318. Note that the interactions in block 318 are simplified, merely provided as examples, and do not show the end event "k." For explanatory purposes below, it is assumed that the shown interactions having a value for a positive outcome ultimately ended in an event "k" within the time period defined for tracked customer Journey 1.

At block 320, the discovery system 108 may calculate, for each interaction, the probability that the interaction will lead to a positive outcome and the precision for the probability that the interaction will lead to a positive outcome. For example, a probability that an interaction will lead to a positive outcome may be calculated as (number of occurrences of the interaction that go on to ultimately end with an event that defines the positive outcome for the customer journey) divided by (number of occurrences of the customer journey).

For example, the number of occurrences of a positive outcome for each interaction shown in block 318 may be divided by the number of occurrences of the tracked customer Journey 1. The value of 10,000 as shown in block 310 may be used for the number of occurrences of the customer Journey 1 because 10,000 is the number of occurrences of the interaction "i." Since all occurrences of customer Journey 1 start with the interaction "i", the number of occurrences for interaction "i" is used as the number of occurrences of customer Journey 1.

As an illustration, the number of occurrences of interaction "i0" is 40, as shown in block 318. Interaction "i0" is part of customer Journey 1 since interaction "i0" starts with event "i." As previously stated, the number of occurrences of customer Journey 1 is 10,000. Therefore, the probability that the interaction "i0" will lead to a positive outcome is 40/10,000 or 4%. Similar calculations may be performed for the other interactions shown in block 318 and example results for the probabilities that each interaction will lead to a positive outcome is shown in block 322. Precisions for each of the probabilities that an interaction will lead to a positive outcome may be calculated using a standard deviation formula and example results for precision are likewise shown in block 322.

The discovery system 108 may combine the results from blocks 314 and 322 to provide user behavior patterns in the form of a statistical analysis, such as the example user behavior pattern for customer Journey 1 as shown in block 324. Thus, as a result of the process shown in FIG. 3, the discovery system 108 determines the probabilities that interactions will be the next interaction following a previous interaction (e.g., the probability that a user will perform a next user activity in relation to a previous interaction). The discovery system 108 determines the precisions of the probabilities that the interactions will be the next interaction. The discovery system 108 determines the probabilities that the interactions will lead to a positive outcome. The discovery system 108 determines precisions for the probabilities that the interactions will lead to a positive outcome. Finally, the discovery system 108 stores the detected user behavior patterns for customer journeys in users' behavior pattern database 110. The process in FIG. 3 may be repeated to update the statistical analysis for user behavior patterns in real-time as new user data is aggregated on a real-time rolling basis.

Referring back to FIG. 1, the prediction/recommendation system 112 and decision service system 114 may use the user behavior patterns stored in the users' behavior pattern database 110 to make predictions about a next user activity in a customer journey and provide recommendations to direct the user on the platform, if necessary, to increase a likelihood that the user's customer journey results in a positive outcome. The operations performed by the prediction/recommendation system 112 and decision system 114 (e.g., components of the computer system 100) are later described herein in reference to FIG. 5.

FIG. 4 shows an example table 400 corresponding to a user behavior pattern for a customer journey. The ID for a user's next interaction in a customer journey is shown in column 1. The ID may be the series of event codes corresponding to the user activities that have been tracked for the user through the current interaction in the customer journey and as if the user were to perform the next user activity shown in column 2. In other words, the next user activities in column 2 may be a plurality of potential next user activities for a customer journey in which the user has already performed the user interaction corresponding to "i7i1." For example, if an event "i" corresponding to Add Card Failure is recorded in response to a user performing a user activity for the Add Card Failure event, the event code "i" is added to the previous interaction ID "i7i1" to result in the interaction "i7i1i" for the customer journey as shown in column 1 of table 400. As another example, if an event "3" corresponding to Chat Bot is recorded in response to a user performing a user activity for the Chat Bot event, the event code "3" is added to the previous interaction ID "i7i1" to result in the interaction "i7i13" for the customer journey as shown in column 1 of table 400.

Column 3 of table 400 shows the probability that the next user activity will occur. As discussed above in reference to FIGS. 1-3, the probability that the next user activity will occur may be based on the statistical analysis of the aggregated data of monitored user activity for users of the electronic service provider's platform. The statistical analysis may be frequently updated based on a recent rolling period of aggregated user activity data. Column 4 of table 400 shows the precision of the probability that the next user activity will occur, expressed as a fiftieth percentile range, where a narrower range about the probability of the next user activity indicates greater precision. Column 5 shows the probability that the next user activity will lead to a positive outcome if it were to be performed by the user. As discussed above, a positive outcome may be a defined event for a particular customer journey, and in the example shown in FIG. 6, may be an event that is defined as a positive outcome for the start of the customer journey beginning with event "i" (Add Card Failure). Column 6 shows the precision of the probability of the positive outcomes of column 5, expressed as a fiftieth percentile range, where a narrower range about the probability of the positive outcome indicates greater precision. The precisions of a probability, according to embodiments disclosure herein, may be calculated in various ways as would be understood by one of skill in the art to operate as a measure of the validity of the associated probability. For example, a standard deviation formula may be used to calculate precision in some embodiments.

Referring now to FIG. 5, illustrated is a flow diagram of a process 500 for predicting a next user activity in a customer journey and providing recommendations to a user in the customer journey, in some cases, to direct the user toward a positive outcome for the customer journey in accordance with one or more embodiments of the present disclosure. The blocks of process 500 are described herein as occurring in serial, or linearly (e.g., one after another). However, multiple blocks of process 500 may occur in parallel in various embodiments. In addition, the blocks of process 500 need not be performed in the order shown and/or one or more of the blocks of process 500 need not be performed in various embodiments.

It will be appreciated that first, second, third, etc. are generally used as identifiers herein for explanatory purposes and are not necessarily intended to imply an ordering, sequence, or temporal aspect as can generally be appreciated from the context within which first, second, third, etc. are used.

A computer system may perform the operations of process 500 in accordance with various embodiments. The computer system may be controlled and/or managed by an electronic service provider. The computer system may include a non-transitory memory (e.g., a machine-readable medium) that stores instructions and one or more hardware processors configured to read/execute the instructions to cause the computer system to perform the operations of process 500. In various embodiments, the computer system may be, may be part of, or may include the computer system 100 of FIG. 1 and computer system 800 of FIG. 8.

At block 502, the computer system may monitor user activity of a user that is digitally interacting with a platform (e.g., an application or website) associated with an electronic service provider. For example, the computer system may perform the operations discussed in reference to the users' interaction events collector 104 of FIG. 1, to monitor a string of event codes for a life cycle trail representing the series of user activities that the user has performed on the platform.

At block 504, the computer system may determine that a user activity that the user has performed on the platform corresponds to a customer journey. For example, the user may have performed a user activity on the platform and the user activity was converted to an event code that is recorded to a life cycle trail for the user. The computer system may monitor the life cycle trail and detect the event code as corresponding to the start of a tracked customer journey. In some cases, the user may be further along in the customer journey, and the user activity is an intermediate user activity corresponding to an intermediate event in the customer journey. An intermediate event may be an event that chronologically occurs in the customer journey after the start event and prior to an end event for the customer journey. In cases where the user has performed an intermediate user activity in the customer journey, the corresponding event code may be concatenated to a series of event codes representing user activities that have been performed so far in the customer journey.

Figure 6:
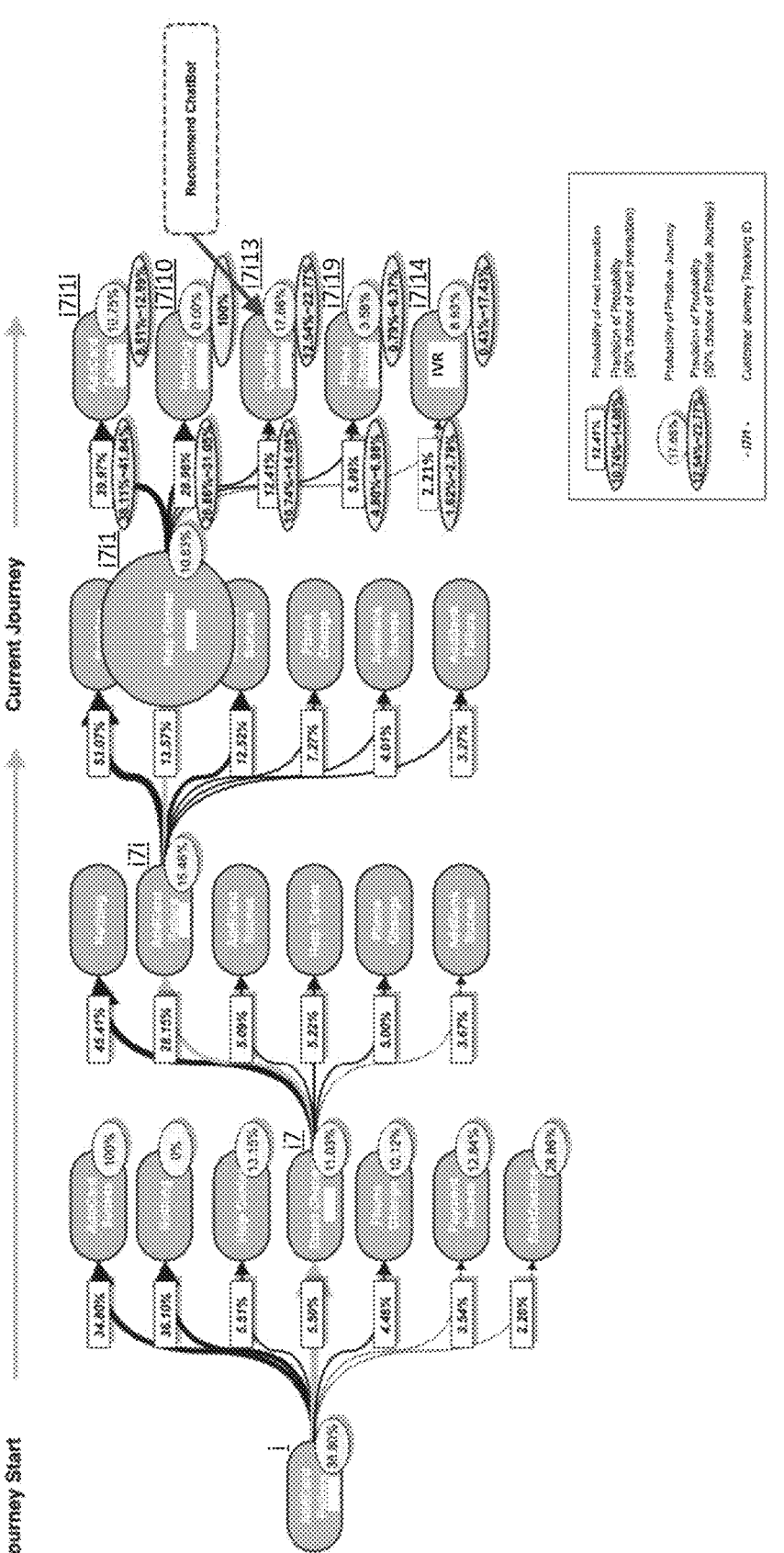
FIG. 6 illustrates a diagram of an example customer journey in accordance with one or more embodiments of the present disclosure.

As an illustration, and in reference to FIG. 6, the computer system may determine that a user activity corresponding to the event code "i" for an "Add Card Failure" event has been performed. For example, the user may have failed in his/her attempt to add payment card information to his/her user account so that he/she can conduct an electronic transaction using the electronic service provider's platform. The aforementioned user activity may trigger the event code "i" for which the computer system monitors as a start to a customer journey that is tracked to observe how users try to solve the problem of failing to add payment card information.

In another case, the computer system may determine that the user activity has been performed, where the user activity corresponds to an intermediate user activity in the customer journey. In such case, the computer system may have already detected the start of the customer journey and has been monitoring the user's activity to track the event codes in the life cycle trail for the user to determine that an intermediate user activity has been performed based on a new event code added to the life cycle trail. For example, as shown in FIG. 6, the computer system may have tracked event codes "i", "7", and "i" again as the user performs corresponding user activities to cause events corresponding to said event codes. Then, the computer system may have detected the next event code of "1" and determined that the user has contacted the Help Center. Each of the events "i", "7", "i", and "1" may have been tracked as part of the customer journey that began with the "Add Card Failure" event corresponding to event code "i." Thus, the interaction in the customer journey through the Help Center event has been "i7i1."

Referring back to FIG. 5, at block 506, the computer system may predict a next user activity that the user will perform in the customer journey. For example, to predict the next user activity, the computer system may retrieve and refer to the customer journey patterns that the discovery system 108 determined, as described in reference to FIG. 3, and stored in the users' behavior pattern database 110 of FIG. 1.

As an illustration, in reference to FIG. 6, if the user is at a current user activity for the interaction "i7i1" (i.e., engaging the Help Center, event code "1"), the computer system may identify the potential next user activities for the customer journey, which may be user activities corresponding to Add Card Failure (event code "i" in "i7i1i"), Nothing (event code "0" in "i7i10"), Chat bot (event code "3" in "i7i13"), Phone change (event code "9" in "i7i19"), and Interactive Voice Response (IVR) (event code "4" in "i7i14").

The computer system may determine the probabilities for each potential next user activity by querying the users' behavior pattern database 110 of FIG. 1. For example, as shown in FIG. 6, the probability that there is a user activity corresponding to the Add Card Failure after the Help Center is 39.97%. The probability that there is a user activity corresponding to Nothing after the Help Center is 28.96%. The probability that there is a user activity corresponding to the Chat Bot after the Help Center is 12.41%. The probability that there is a user activity corresponding to the Phone Change after the Help Center is 5.89%. The probability that there is a user activity corresponding to IVR after the Help Center is 2.21%.

The computer system may compare the probabilities of the potential next user activities for the customer journey to predict which potential next user activity is most likely to occur. In some embodiments, the computer system may select the next user activity that has the highest probability as the predicted next user activity. However, in some embodiments, the computer system may consider other factors such as the precisions of the probabilities of the potential next user activities when predicting which next user activity is most likely to occur. As an illustration, consider a situation in which a potential next user activity A has a probability that is marginally less than a probability of potential next user activity B. If the probability of potential next user activity A has a greater precision than the precision of the probability of potential next user activity B, the computer system may select the potential next user activity A as the predicted next user activity, even though the probability of potential next user activity A is less than the probability of potential next user activity B. In some cases, a defined threshold may be used for the margin of difference between probabilities before precision is considered.

To further explain process 500, it is assumed that in the embodiment shown in FIG. 6, the computer system selects the Add Card Failure event as the predicted next user activity in the customer journey at block 506 of FIG. 5 because the Add Card Failure event has the highest probability of occurring amongst the potential next user activities.

Referring back to FIG. 5, at block 508, the computer system may determine a first probability that the predicted next user activity will lead to a positive outcome for the customer journey. As previously discussed in the present disclosure, the probabilities that next user activities will lead to a positive outcome in a customer journey may be computed by the behavior pattern discovery system 108 and stored in users' behavior pattern database 110. The computer system may query the users' behavior pattern database 110 for the probability that the next user activity predicted at block 506 will lead to a positive outcome for the customer journey. For example, as shown in FIG. 6, a first probability that Add Card Failure (the predicted next user activity in the customer journey), will lead to a positive outcome for the customer journey is determined to be 10.75%.

Referring back to FIG. 5, at block 510, the computer system may determine a second probability that an alternative user activity from the potential next user activities will lead to a positive outcome for the customer journey. All of the potential next user activities that were not predicted to be the next user activity may be considered an alternative user activity to the predicted next user activity. Thus, for each of the alternative user activities, the computer system may query the users' behavior pattern database 110 for the probability that the alternative user activity will lead to a positive outcome for the customer journey.

For example, as shown in FIG. 6, the probability that the user performing a user activity corresponding to the Nothing event (event code "0" in interaction "i7i10") will lead to a positive outcome is determined to be 0.00%. The probability that the user performing a user activity corresponding to the Chat Bot event (event code "3" in interaction "i7i13") will lead to a positive outcome is determined to be 17.66%. The probability that the user performing a user activity corresponding to the Phone Change event (event code "9" in "i7i19") will lead to a positive outcome is determined to be 3.58%. The probability that the user performing a user activity corresponding to the IVR event (event code "4" in interaction i7i14) will lead to a positive outcome is determined to be 8.93%. Each of the aforementioned probabilities may be considered a second probability of an alternative user activity for the operations at blocks 510 and 512 of FIG. 5.

Referring back to FIG. 5, at block 512, the computer system may determine that a second probability that an alternative user activity will lead to a positive outcome for the customer journey is greater than the first probability corresponding to the predicted next user activity leading to a positive outcome to the customer journey. For example, the computer system may compare the probability that the predicted next user activity will lead to a positive outcome to the second probabilities of the alternative user activities determined at block 510 to identify whether there is an alternative user activity to the predicted next user activity that has a higher probability of leading to a positive outcome in the customer journey.

For example, as shown in FIG. 6, an alternative user activity for the Chat Bot event (e.g., engaging a chat bot messenger, causing an event "3", and performing interaction "i7i13") has a higher probability of leading to a positive outcome for the customer journey than the predicted next user activity of Add Card Failure (e.g., trying to add the payment card information, causing an event code "i", and performing interaction "i7i1i"). In other words, the user attempting to add payment card information after engaging the Help Center is less likely to lead to a positive outcome to the customer journey than if the user were to engage a chat bot messenger after engaging the Help Center at this point in the customer journey.

Referring back to FIG. 5, at block 514, the computer system may direct the user to the alternative user activity. In reference to FIG. 6, the predicted next user activity was the user attempting to add a payment card to their user account (e.g., causing an Add Card Failure event) based on behavior patterns determined from statistical analysis of aggregated user data as discussed herein. However, attempting to add payment card information after the engaging the Help Center had a lower probability of leading to a positive outcome than if the user were to engage with a chat bot messenger (e.g., causing a Chat Bot event) after the engaging the Help Center.

Thus, in the example shown in FIG. 6, although, statistically, users are more likely to try to add payment card information again in the customer journey after engaging the Help Center, there is a greater probability of a positive outcome to the customer journey if the user engages with the chat bot messenger. Therefore, the computer system may direct the user to engage with the chat bot messenger as an alternative user activity instead of passively letting the user advance to the predicted next user activity of attempting to add the payment card information again.

In some embodiments, the computer system may consider the precision of the probabilities for user activities leading to a positive outcome. For example, a scenario is contemplated in which the second probability above is not greater than the first probability. The computer system may compare the precision of the first probability to a threshold and compare the precision of the second probability to the threshold. If the precision for the first probability fails to meet the threshold while the precision for the second probability meets the threshold, the computer system may direct the user to the alternative user activity even though the second probability is lower than the first probability.

Another scenario is contemplated in which the computer system may determine that a third probability that a third user activity (e.g., a user activity other than the aforementioned predicted next user activity or alternative user activity) from the plurality of potential next user activities for the customer journey will lead to the positive outcome. The third probability may be greater than the second probability and/or first probability, however, when the computer system determines a precision for the third probability, the computer system may find that the precision for the third probability fails to meet the threshold precision. Thus, the computer system may proceed with either not intervening in the customer journey (if it is determined that the predicted next user activity is more likely to lead to a positive outcome over the alternative user activity), or actively directing the user to an alternative user activity as described herein (if it is determined that the alternative user activity is more likely to lead to a positive outcome than the predicted next user activity).

The computer system may direct the user to the alternative user activity in various ways. For example, the computer system may provide a visual recommendation in a user interface for the application or website to use the chat bot messenger for the application or website. For example, the computer system may cause a pop-up text box or other visual to appear in the user interface for the application or website that guides the user to the chat bot messenger. As another example, the computer system may cause arrows or other directive symbols to point the user to a user interface element that would activate or otherwise cause the alternative user activity.

In some embodiments, the computer system may cause a user interface element corresponding to the alternative user activity to change in appearance to direct an attention of the user to the user interface element corresponding to the alternative user activity. For example, a chat bot messenger button may blink or flash to direct the user's attention to the chat bot messenger. In further embodiments, the computer system may cause the chat bot messenger to automatically open and pre-fill a query that the user can send in relation to the customer journey. For example, a customer journey for adding payment card information may have a query pre-filled such as "Can you please help me add payment card information to my account?" so that the user can simply press a send button to deliver the messenger to a chat bot or customer service representative.

In various embodiments, the computer system may direct the user to the alternative user activity by causing a screen of the user interface of the application or website to darken while highlighting a user interface element for the alternative user activity such that the user interface element stands out.

Referring now to FIG. 7, a block diagram of a networked system 700 configured to facilitate one or more processes in accordance with various embodiments of the present disclosure is illustrated. System 700 includes user devices 704A-704N and electronic service provider servers 706A-706N. A user 702A is associated with user device 704A, where user 702A can provide an input to service provider servers 706A-706N using user device 704A. Users 702A+1 through 702N may be associated with user devices 704A+1 through 704N, where users 702A+1 through 702N can provide an input to service provider servers 706A-706N using their respective user device.

User devices 704A-704N and service provider servers 706A-706N may each include one or more processors, memories, and other appropriate components for executing instructions such as program code and/or data stored on one or more computer-readable mediums to implement the various applications, data, and operations described herein. For example, such instructions may be stored in one or more computer-readable media such as memories or data storage devices internal and/or external to various components of system 700, and/or accessible over a network 708. Each of the memories may be non-transitory memory. Network 708 may be implemented as a single network or a combination of multiple networks. For example, in various embodiments, network 708 may include the Internet or one or more intranets, landline networks, and/or other appropriate types of networks.

User device 704A may be implemented using any appropriate hardware and software configured for wired and/or wireless communication over network 708. For example, in some embodiments, user device 704A may be implemented as a personal computer (PC), a mobile phone, personal digital assistant (PDA), laptop computer, and/or other types of computing devices capable of transmitting and/or receiving data, such as an iPhone™, Watch™, or iPad™ from Apple™.

User device 704A may include one or more browser applications which may be used, for example, to provide a convenient interface to facilitate responding to requests over network 708. For example, in one embodiment, the browser application may be implemented as a web browser configured to view information available over the interne and respond to requests sent by service provider servers 706A-706N. User device 704A may also include one or more toolbar applications which may be used, for example, to provide client-side processing for performing desired tasks in response to operations selected by user 702A. In one embodiment, the toolbar application may display a user interface in connection with the browser application.

User device 704A may further include other applications as may be desired in particular embodiments to provide desired features to user device 704A. For example, the other applications may include an application to interface between service provider servers 706A-706N and the network 708, security applications for implementing client-side security features, programming client applications for interfacing with appropriate application programming interfaces (APIs) over network 708, or other types of applications. In some cases, the APIs may correspond to service provider servers 706A-706N. The applications may also include email, texting, voice, and instant messaging applications that allow user 702A to send and receive emails, calls, and texts through network 708, as well as applications that enable the user 702A to communicate to service provider servers 706A-706N. User device 704A includes one or more device identifiers which may be implemented, for example, as operating system registry entries, cookies associated with the browser application, identifiers associated with hardware of user device 704A, or other appropriate identifiers, such as those used for user, payment, device, location, and or time authentication. In some embodiments, a device identifier may be used by service provider servers 706A-706N to associate user 702A with a particular account maintained by the service provider servers 706A-706N. A communications application with associated interfaces facilitates communication between user device 704A and other components within system 700. User devices 704A+1 through 704N may be similar to user device 704A.

Service provider servers 706A-706N may be maintained, for example, by corresponding online service providers, which may provide electronic transaction services in some cases. In this regard, service provider servers 706A-706N may include one or more applications which may be configured to interact with user devices 704A-704N over network 708 to facilitate the electronic transaction services. Service provider servers 706A-706N may maintain a plurality of user accounts (e.g., stored in a user account database accessible by service provider servers 706A-706N), each of which may include account information associated with individual users, and some of which may have linked tokens as discussed herein. Service provider servers 706A-706N may perform various functions, including communicating over network 708 with each other, and in some embodiments, a payment network and/or other network servers capable a transferring funds between financial institutions and other third-party providers to complete transaction requests and process transactions.

Figure 8:
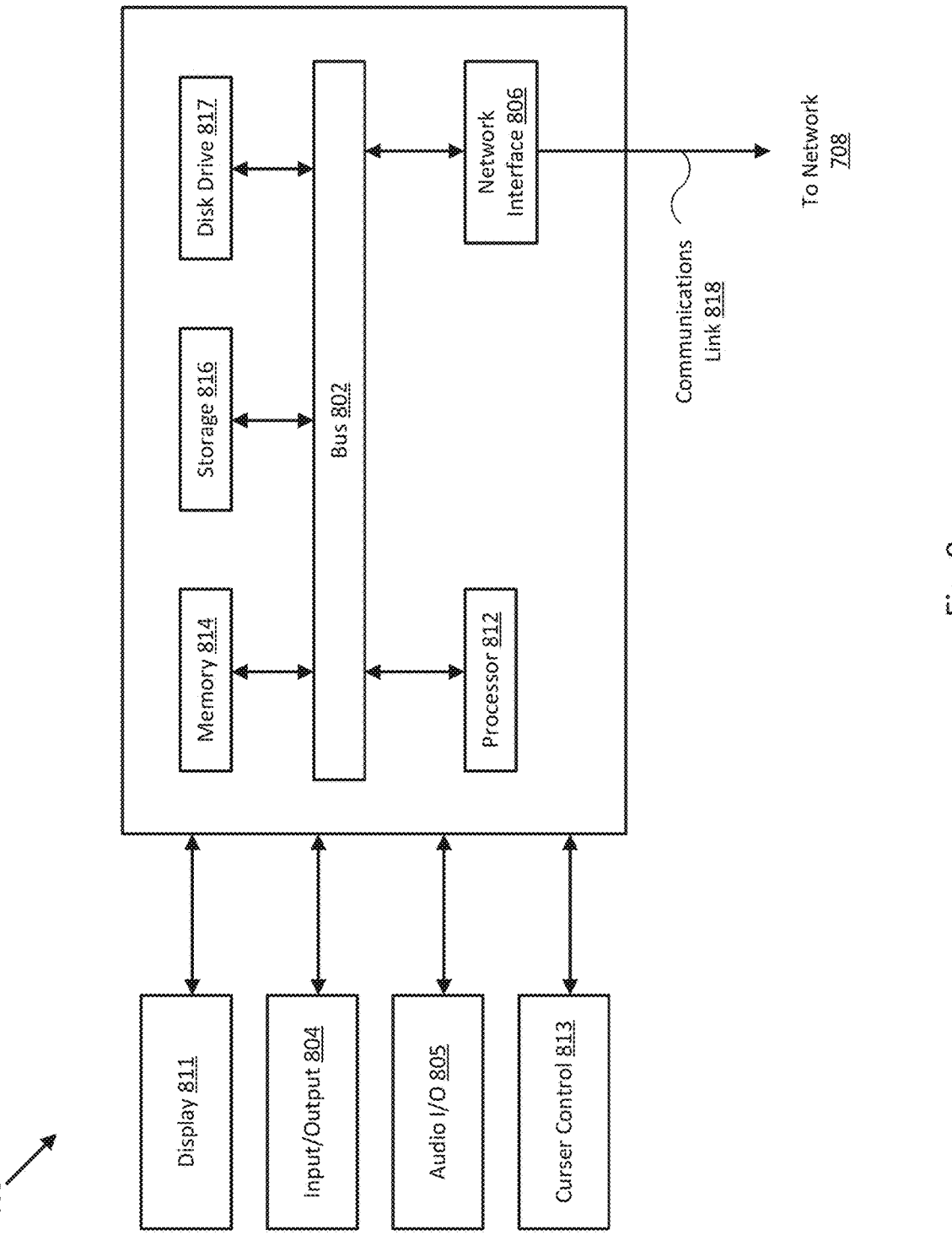
FIG. 8 illustrates a block diagram of a computer system implemented in accordance with one or more embodiments of the present disclosure.

FIG. 8 illustrates a block diagram of a computer system 800 suitable for implementing one or more embodiments of the present disclosure. It should be appreciated that each of the devices utilized by users, entities, and service providers discussed herein (e.g., the computer system) may be implemented as computer system 800 in a manner as follows.

Computer system 800 includes a bus 802 or other communication mechanism for communicating information data, signals, and information between various components of computer system 800. Components include an input/output (I/O) component 804 that processes a user action, such as selecting keys from a keypad/keyboard, selecting one or more buttons or links, etc., and sends a corresponding signal to bus 802. I/O component 804 may also include an output component, such as a display 811 and a cursor control 813 (such as a keyboard, keypad, mouse, etc.). I/O component 804 may further include NFC communication capabilities. An optional audio I/O component 805 may also be included to allow a user to use voice for inputting information by converting audio signals. Audio I/O component 805 may allow the user to hear audio. A transceiver or network interface 806 transmits and receives signals between computer system 800 and other devices, such as another user device, an entity server, and/or a provider server via network 708. In one embodiment, the transmission is wireless, although other transmission mediums and methods may also be suitable. Processor 812, which may be one or more hardware processors, can be a micro-controller, digital signal processor (DSP), or other processing component, processes these various signals, such as for display on computer system 900 or transmission to other devices via a communication link 818. Processor 812 may also control transmission of information, such as cookies or IP addresses, to other devices.

Components of computer system 800 also include a system memory component 814 (e.g., RAM), a static storage component 816 (e.g., ROM), and/or a disk drive 817. Computer system 800 performs specific operations by processor 812 and other components by executing one or more sequences of instructions contained in system memory component 814. Logic may be encoded in a computer-readable medium, which may refer to any medium that participates in providing instructions to processor 812 for execution. Such a medium may take many forms, including but not limited to, non-volatile media, volatile media, and transmission media. In various implementations, non-volatile media includes optical or magnetic disks, volatile media includes dynamic memory, such as system memory component 814, and transmission media includes coaxial cables, copper wire, and fiber optics, including wires that comprise bus 802. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 800. In various other embodiments of the present disclosure, a plurality of computer systems 800 coupled by communication link 818 to the network 708 (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A computer system comprising:
   a non-transitory memory storing instructions; and
   one or more hardware processors configured to execute the instructions and cause the computer system to perform operations comprising:
   monitoring user activity of a user on an application or a website;
   determining that the user activity was or is associated with an occurrence of a technical issue in the application or on the website, the technical issue preventing a functionality of the application or the website from being accessed;
   triggering, based on the determining, a tracking of a customer journey, the customer journey comprising a series of digital interactions between the user and the application or the website that take place during and after the occurrence of the technical issue;
   predicting a next user activity that the user will perform as a part of the customer journey, wherein the next user activity is one of a plurality of potential next user activities for the customer journey;
   determining a first probability that the predicted next user activity will lead to a positive outcome for the customer journey, wherein the positive outcome comprises a successful troubleshooting of the technical issue;
   determining a second probability that an alternative user activity involving a chat bot messenger from the plurality of potential next user activities for the customer journey will lead to the positive outcome;
   determining that the second probability is a threshold amount greater than the first probability; and
   based on the determining that the second probability is the threshold amount greater than the first probability, directing, via a user interface for the application or the website, the user to the alternative user activity, wherein the directing is performed at least in part by reconfiguring one or more elements of the user interface, wherein the reconfiguring comprises automatically initiating a session of the chat bot messenger and pre-filling the session with a query directed to the technical issue.

2. The computer system of claim 1, wherein the reconfiguring further comprises:
   changing a visual appearance of a first element of the one or more elements; or
   adding, to the user interface, a second element to the one or more elements, wherein the second element did not appear in the user interface when the second probability was determined.

3. The computer system of claim 1, wherein the predicting the next user activity is based on a statistical analysis of aggregated data corresponding to user activities for a plurality of users of the application or the website, and wherein the operations further comprise:

aggregating the data over a past period on a rolling basis; and updating the statistical analysis of the aggregated data in real-time as the data is aggregated on the rolling basis.

4. The computer system of claim 1, wherein the next user activity is a first user activity, wherein the alternative user activity is a second user activity, and wherein the operations further comprise:

determining a third probability that a third user activity from the plurality of potential next user activities for the customer journey will lead to the positive outcome;

determining that the third probability is greater than the second probability;

determining a precision for the third probability; and determining that the precision for the third probability fails to meet a threshold precision, wherein the directing the user to the alternative user activity is further based on the precision for the third probability failing to meet the threshold precision.

5. The computer system of claim 1, wherein the operations further comprise:

determining a precision for the second probability; and determining that the precision meets a threshold precision for the second probability, wherein the directing is further based on the determining that the precision meets the threshold precision for the second probability.

6. The computer system of claim 1, wherein the technical issue comprises a failure of the application or the website to add payment card information to a user account of the user.

7. The computer system of claim 1, wherein the operations further comprise highlighting the session of the chat bot messenger or darkening a rest of the user interface that does not include the session of the chat bot messenger.

8. A method comprising:

determining that a user activity corresponding to a customer journey has been performed by a user interacting with an application or a website;

determining that the user activity was accompanied by a technical issue that interfered with an ability of the user to access a functionality of the application or the website;

tracking, based on the determining that the user activity was accompanied by the technical issue, subsequent digital interactions between the user and the application or the website as a rest of the customer journey;

predicting a next user activity that the user will perform in the rest of the customer journey, wherein the next user activity is one of a plurality of potential next user activities for the rest of the customer journey;

determining a first probability that the predicted next user activity will lead to an outcome for the rest of the customer journey that comprises a successful resolution of the technical issue;

determining a second probability that an alternative user activity from the plurality of potential next user activities of the customer journey will lead to the outcome, wherein the alternative user activity involves an engagement of a chat bot;

determining that the second probability is a threshold amount greater than the first probability; and based on the second probability being the threshold amount greater than the first probability, automatically launching the chat bot and attaching a query to the chat bot, wherein the query pertains to the technical issue.

9. The method of claim 8, further comprising monitoring event codes in a life cycle trail for the user, wherein the user activity triggers an event code recordation in the life cycle trail, and wherein the determining that the user activity corresponding to the customer journey has been performed comprises detecting the event code.

10. The method of claim 8, wherein the predicting the next user activity is based on a statistical analysis of aggregated data corresponding to user activities for a plurality of users of the application or the website.

11. The method of claim 8, wherein the predicting the next user activity comprises:

comparing probabilities of occurrence corresponding to the plurality of potential next user activities; and selecting the predicted next user activity based on a highest probability of occurrence for the predicted next user activity.

12. The method of claim 8, wherein the determined user activity corresponds to an intermediate user activity in a chronological order of user activities for the customer journey.

13. The method of claim 8, further comprising:

determining a precision for the second probability; and determining that the precision meets a threshold precision for the second probability, wherein the incentivizing the user is further based on the precision meeting the threshold precision for the second probability.

14. The method of claim 8, wherein the outcome comprises completing an electronic transaction using the application or the website.

15. A non-transitory machine-readable medium having instructions stored thereon, wherein the instructions are executable to cause a machine of a system to perform operations comprising:

monitoring user activity for a user interacting with an application or a website;

determining, based on the monitoring, that a user activity of the monitored user activity resulted in an inability of the user to access a specified functionality of the application or the website;

predicting a next user activity that the user will perform as a part of potential digital interactions between the user and the application or the website subsequent to the inability of the user to access the specified functionality of the application or the website;

determining a first probability that the predicted next user activity will lead to a specified outcome, wherein the specified outcome comprises an ability of the user to access the specified functionality of the application or the website;

determining a second probability that an alternative user activity associated with a chat bot messenger will lead to the specified outcome;

determining that the second probability is a threshold amount greater than the first probability; and based on the second probability being the threshold amount greater than the first probability, directing the user to the alternative user activity at least in part by automatically launching the chat bot messenger via the application or the website and including, in the automatically launched chat bot messenger, content associated with the specified functionality of the application or the website.

16. The non-transitory machine-readable medium of claim 15, wherein the predicting the next user activity is based on a statistical analysis of aggregated data corresponding to user activities for a plurality of users of the application or the website.

17. The non-transitory machine-readable medium of claim 16, wherein the operations further comprise:

aggregating the data over a past period on a rolling basis; and updating the statistical analysis of the aggregated data in real-time as the data is aggregated on the rolling basis.

18. The non-transitory machine-readable medium of claim 15, wherein the chat bot messenger is automatically launched in a form of a pop-up window.

19. The non-transitory machine-readable medium of claim 15, wherein the operations further comprise:

determining a precision for the second probability; and determining that the precision meets a threshold precision for the second probability, wherein the directing is further based on the determining that the precision meets the threshold precision for the second probability.

20. The non-transitory machine-readable medium of claim 15, wherein the chat bot messenger is highlighted or a rest of the application or the website is darkened.

* * * * *